(No Model.)
J. EBBERT.
STEAM COOKING VESSEL.
No. 280,591. Patented July 3, 1883.
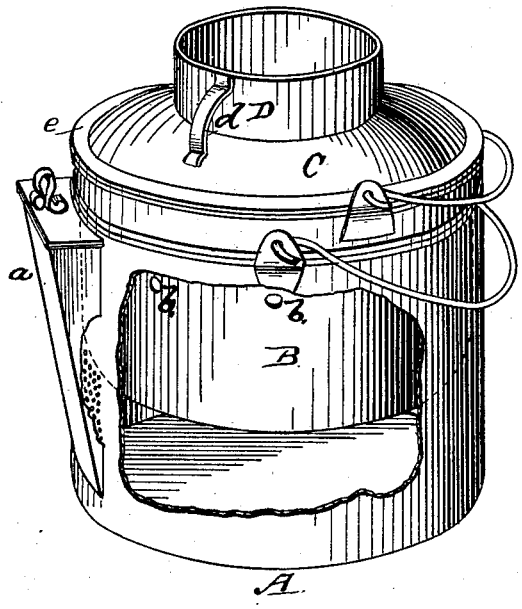
Witnesses:
Inventor
Jerry Ebbert,
Attorney

UNITED STATES PATENT OFFICE.

JERRY EBBERT, OF MARTIN'S FERRY, OHIO.

STEAM COOKING VESSEL.

SPECIFICATION forming part of Letters Patent No. 280,591, dated July 3, 1883.

Application filed April 26, 1883. (No model.)

*To all whom it may concern:*

Be it known that I, JERRY EBBERT, a citizen of the United States of America, residing at Martin's Ferry, in the county of Belmont and State of Ohio, have invented certain new and useful Improvements in Steam Cooking Vessels; and I do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

This invention relates to certain new and useful improvements in steam cooking vessels; and it consists, more especially, in providing that class of vessels which are known as "steam-cookers" with a cover which is provided at its upper part with a raised rim or wall, which serves as a receptacle for cold water, whereby the steam which is formed in the lower vessel for the purpose of cooking the food contained in the second vessel, which is provided with suitable perforations for the admission of this steam, will be caused to condense upon the inner side of the cover and fall upon the article to be cooked, thereby providing a means for artificially basting the article to be cooked, as will be hereinafter more fully set forth, and pointed out in the claim.

In the accompanying drawing I have illustrated my invention by a perspective view, the same being partly in section, in which A represents a suitable vessel which is placed upon the stove, and which will contain water which will be generated into steam. This vessel is provided at one side with a suitably-constructed spout, $a$, with a cover at its upper part, as shown. The lower end of this spout is provided with a strainer, which connects with the vessel A. This vessel is preferably cylindrical in shape, and is provided with a handle, as shown.

The inner vessel, B, in which the article to be cooked is placed, may be conical, or the sides thereof may be slightly tapering, so as to allow the steam to freely circulate about its exterior. Near the upper part of this vessel are provided a number of perforations, $b$, above which is formed a suitable bead which rests upon the upper end of the vessel A. This vessel B is also provided with a suitable handle.

C represents a cover for the upper vessel, A, which is provided with a downwardly-projecting flange and a projecting bead, $e$. To the upper part of this cover C is secured a rim, D, which is provided with a handle, $d$, which is connected to the upper part of the rim D and to the upper surface of the cover C. It is evident that this wall or rim D will form a receptacle on the top of the cover which will hold liquid, the use of which will be hereinafter set forth.

The lower bucket, A, may be used either for transporting liquid or as a strainer for any liquid that may be placed therein, which can be poured from the spout $a$, and in preparing articles to be cooked the vessel B may be removed therefrom while they are placed therein.

The operation of this invention is as follows: A suitable amount of water is placed in the vessel A, and the same is heated. The vessel B is then placed within the vessel A, and the steam which is generated passes into said vessel through the perforations $b\ b$, which steam serves to cook the article placed therein. After the cooking process has progressed sufficiently, and it is desired to baste the article contained in the vessel B, cold water is placed in the receptacle D upon the cover C. The steam, coming in contact with this cooled surface, condenses and falls upon the article within the vessel B, thereby basting the same.

Having thus described my invention, what I claim as new, and desire to secure by Letters Patent, is—

In combination with the cover C, having the water-receptacle D secured to its upper part, the receptacle B, with its perforations $b$, adapted to fit within a steam cooking vessel, the parts being provided with suitable handles, substantially as shown, and for the purpose set forth.

In testimony whereof I affix my signature in presence of two witnesses.

JERRY EBBERT.

Witnesses:
JAMES RALSTON,
J. T. HANES.